United States Patent
Okoshi et al.

(10) Patent No.: US 6,739,192 B1
(45) Date of Patent: May 25, 2004

(54) ANGULAR VELOCITY SENSOR

(75) Inventors: Hideo Okoshi, Osaka (JP); Shoichi Takeno, Fukui (JP); Katsuhiko Omoto, Fukui (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 281 days.

(21) Appl. No.: 09/831,490
(22) PCT Filed: Sep. 6, 2000
(86) PCT No.: PCT/JP00/06032
§ 371 (c)(1), (2), (4) Date: Jul. 25, 2002
(87) PCT Pub. No.: WO01/20258
PCT Pub. Date: Mar. 22, 2001

(30) Foreign Application Priority Data

Sep. 10, 1999 (JP) .......................... 11-257021

(51) Int. Cl.⁷ ................................. G01P 9/00
(52) U.S. Cl. ................. 73/504.16; 73/504.15; 73/514.02
(58) Field of Search .................. 73/504.16, 504.15, 73/514.02, 514.12; 310/370

(56) References Cited

U.S. PATENT DOCUMENTS

| 4,898,031 A | 2/1990 | Oikawa et al. |
| 4,958,519 A | * 9/1990 | Whaley .................... 73/504.16 |
| 5,854,843 A | * 12/1998 | Jacknin et al. ............. 381/309 |
| 6,220,093 B1 | * 4/2001 | Hirosawa ................. 73/504.16 |

FOREIGN PATENT DOCUMENTS

| EP | 0 660 081 | 6/1995 |
| JP | 3-103708 | 4/1991 |
| JP | 6-331363 | 12/1994 |
| JP | 7-159423 | 6/1995 |
| JP | 7-294263 | 11/1995 |
| JP | 8-170917 | 7/1996 |
| JP | 2527417 | 11/1996 |
| JP | 10-30928 | 2/1998 |
| JP | 11-6736 | 1/1999 |
| JP | 11-257967 | 9/1999 |

* cited by examiner

*Primary Examiner*—Hezron Williams
*Assistant Examiner*—Jacques M. Saint-Surin
(74) *Attorney, Agent, or Firm*—RatnerPrestia

(57) ABSTRACT

An angular velocity sensor structured so as to reduce the application of external vibrations to tuning fork as described below. Supporting plate having plate having placement part for placing first rubber body over the top face thereof is placed above the top face of second base via at least two supports so as to provide space between the top face of second base and the supporting plate. First cover and fist base housing tuning fork are placed on first rubber body. Further placed on first cover is second rubber body. The top face of supporting plate and the inner ceiling of second cover compress and hold first rubber body and second rubber body therein.

19 Claims, 10 Drawing Sheets

ANGULAR VELOCITY SENSOR

THIS APPLICATION IS A U.S. NATIONAL PHASE APPLICATION OF PCT INTERNATIONAL APPLICATION PCT/JP00/06032.

FIELD OF THE INVENTION

The present invention relates to an angular velocity sensor used for the attitude control and navigation system of such moving bodies as an aircraft and vehicle.

BACKGROUND OF THE INVENTION

Known as this type of conventional angular velocity sensor is that disclosed in Japanese Patent Application Non-examined Publication No. H08-170917.

Such a conventional angular velocity sensor is hereinafter explained with reference to the drawings.

FIG. 9 shows a perspective view of the conventional angular velocity sensor showing that a tuning fork is secured to a base; and FIG. 10 is a sectional side elevation view of the same angular velocity sensor.

In FIGS. 9 and 10, columnar tuning fork 1 is composed of a pair of columns 2 and joint 3 connecting the ends of this pair of columns 2 together. Provided on each of the outer side faces of the pair of columns 2 of tuning fork 1 is driving piezoelectric elements 4. In addition, provided on the side faces coplanar with those having driving piezoelectric elements 4 are reference piezoelectric elements 5. Moreover, provided on the side faces different from those having driving piezoelectric elements 4 and reference piezoelectric elements 5 are a pair of detecting piezoelectric elements 6. Metallic supporting member 7 supports the base of joint 3 of tuning fork 1. The bottom face of supporting member 7 is secured to the top face of metallic base 8, and this base 8 also has a plurality of terminal-insertion holes 9 therein. Terminals 10 pass through these terminal-insertion holes 9 via insulators 11 and electrically connect to driving piezoelectric elements 4, reference piezoelectric elements 5, and detecting piezoelectric elements 6 of tuning fork 1. Circuit board 12 is provided under base 8 and connected to leads 13 by soldering that are electrically connected to terminals 10 through base 8. The circuit board 12 also has electronic components 14 mounted thereon for processing output signal generated by angular velocity from detecting piezoelectric elements 6 on tuning fork 1. Supporting base 15 supports base 8 and circuit board 12 using stud bolt 16. Metallic cover 17 houses tuning fork 1, base 8 and circuit board 12 therein and covers supporting base 15.

The operation of the conventional angular velocity sensor constructed as above is described below.

Applying alternative voltages to driving piezoelectric elements 4 on tuning fork 1 allows tuning fork 1 to perform flexural vibration at its characteristic frequency in the driven direction and at a speed of V in the driven direction. When tuning fork 1 rotates at an angular velocity of $\omega$ the central axis of tuning fork 1 in this condition, a Coriolis force of F=2 mV$\omega$ is generated in the pair of columns 2 of tuning fork 1, where m is the effective mass of the tuning fork. With this angular velocity sensor, angular velocity were detected by the following steps: amplifying the electric charges generated by the Coriolis force in detecting piezoelectric elements 6 using electronic components 14 on circuit board 12; and measuring the electric charges as output voltages, using an external computer.

However, with the above-mentioned conventional structure, base 8 and circuit board 12 are connected to supporting base 15 via stud bolt 16 as shown in FIG. 10 and thus external vibrations are applied to the sensor via this stud bolt 16. Such external vibrations are applied to tuning fork 1 and may generate electric charges in detecting piezoelectric elements 6 on tuning fork 1 even when no angular velocity is applied to the angular velocity sensor. As a result, the angular velocity sensor has a problem of deterioration of its output characteristics.

The present invention addresses the above-mentioned problem and aims to provide an angular velocity sensor in which only little vibration is applied to its tuning fork composed of first oscillator and second oscillator even when external vibration is applied to the sensor with no angular velocity applied thereto and thus allows the prevention of deterioration of its output.

SUMMARY OF THE INVENTION

The angular velocity sensor of the present invention has a tuning fork outputting a signal responsive to angular velocity; a first base for securing a part of the tuning fork to the top face of the base; a first cover for covering the tuning fork together with the first base; a second rubber body in contact with the top face of the first cover, a first rubber body having a top face in contact with the bottom face of the first base; a supporting plate having a top face in contact with the bottom face of the first rubber body; a second base provided under the supporting plate; a tubular second cover having a bottom and housing the tuning fork, the first base, the first cover, the second rubber body, the first rubber body, and the supporting plate together with the second base. The first and second rubber bodies are compressed and held by the top face of the supporting plate and the inner ceiling of the second cover.

Also the angular velocity sensor of the present invention has a first oscillator having at least one driving electrode or detecting electrode; a second oscillator having at least one detecting electrode or driving electrode; a joint connecting one end of the first oscillator and one end of the second oscillator, a first base for securing the joint thereon and having at least three terminal-insertion holes for passing through at least three terminals electrically connected to the driving electrode or detecting electrode; a first cover secured to the top face of this first base for covering the first and second oscillators and the joint; a first rubber body having a top face in contact with the bottom face of the first base; a second rubber body in contact with the top face of the first cover; a circuit board provided under the first base and having electronic components for processing output signals generated by angular velocity from the detecting electrode, and a power-supply terminal, ground terminal, and output terminal projecting downwardly; a second base provided under the circuit board and having through holes for passing and securing the power-supply terminal, ground terminal, and output terminal; and a second tubular cover having a bottom secured to the top face of the second base and covering the first base, first cover, first rubber body, second rubber body, and circuit board. A supporting plate having a placement part on the top face thereof for placing the first rubber body is provided above the top face of the second base so as to provide a space between the top face of the second base and the supporting plate. The top face of this supporting plate and the inner ceiling of the second cover compress the first rubber body and second rubber body.

With this structure, a supporting plate having a placement part on the top face thereof for placing the first rubber body is provided above the top face of the second base so as to provide a space between the top face of the second base and the supporting plate via at least two supports and the top face of this supporting plate and the inner ceiling of the second cover compress the first rubber body and second rubber body. Therefore, the first base and the first cover housing the first and second oscillators therein are securely supported by the first and second rubber bodies. Consequently, even when external vibrations are applied to the angular velocity sensor, these vibrations transferred to the first and second oscillators are reduced.

Also the angular velocity sensor of the present invention has a first recess provided on the bottom face of the second rubber body and a step provided in the inner ceiling of the first recess. The bottom face of this step and the top face of the first cover are brought into contact with each other. In addition, second recesses projecting outwardly are provided on the inner side faces of the first recess. With this structure, the bottom face of the step in the inner ceiling of the first recess in the second rubber body is in contact with the top face of the first cover and the portions provided on the inner side faces of the first recess other than the second recesses are in contact with the outer side faces of the first cover. Such contact reduces the area in which the second rubber body and the first cover are in contact with each other and thus the second rubber body attenuates external vibrations transferred to the first and second oscillators of the angular velocity sensor.

For the angular velocity sensor of the present invention, the second rubber body has the first recess shaped to a rectangular parallelepiped, a step provided on the outer periphery of the inner ceiling of the first recess, and second recesses provided in the portions along long sides of the first recess other than the edges thereof. The first cover is also shaped to a rectangular parallelepiped having an opening at the bottom face thereof. Then the step in the second rubber body is brought into contact with the outer periphery of the top face of the first cover and the edges of the long sides of the first recess provided in the second rubber body is brought into contact with the outer side faces of the first cover. With this structure, the first cover is brought into contact with the second rubber body only on the outer periphery of the top face and edges of the outer side faces thereof. As a result, even when external rotational shocks are applied to the angular velocity sensor, the first cover is rarely rotated by the rotational shocks because the cover is secured to the second rubber body on the outer periphery of the top face and edges of outer side faces thereof.

The angular velocity sensor of the present invention also has escapes for receiving at least three terminals through the first base, in the first rubber body thereof. The terminals through the first base are housed in the escapes in the first rubber body and such a structure enables downsizing of the sensor.

The angular velocity sensor of the present invention also has notches for positioning at least two supports, in the side faces of the circuit board thereof. The supports of the supporting plate fit into the notches and such a structure prevents the supporting plate from moving even when strong lateral vibrations are applied to the angular velocity sensor.

For the angular velocity sensor of the present invention, the first base and the first cover are secured to each other so as to create a vacuum in the interior space formed therebetween. This structure reduces the air resistance in the interior space between the first base and the first cover and thus facilitates the vibration of first and second oscillators and improves the output sensitivity of the angular velocity sensor.

For the angular velocity sensor of the present invention, at least two supports of the supporting plate have broad-shouldered portions having a width larger than that of the notches. This structure prevents the supports from coming off from the circuit board, even when external vertical impulsive force is applied to the angular velocity sensor. As a result, the first and second oscillators are securely supported and thus the output of the angular velocity sensor is stabilized.

DESCRIPTION OF THE PREFERRED EMBODIMENTS

An angular velocity sensor in accordance with a preferred embodiment of the present invention is hereinafter explained with reference to the accompanying drawings.

Figure 1:
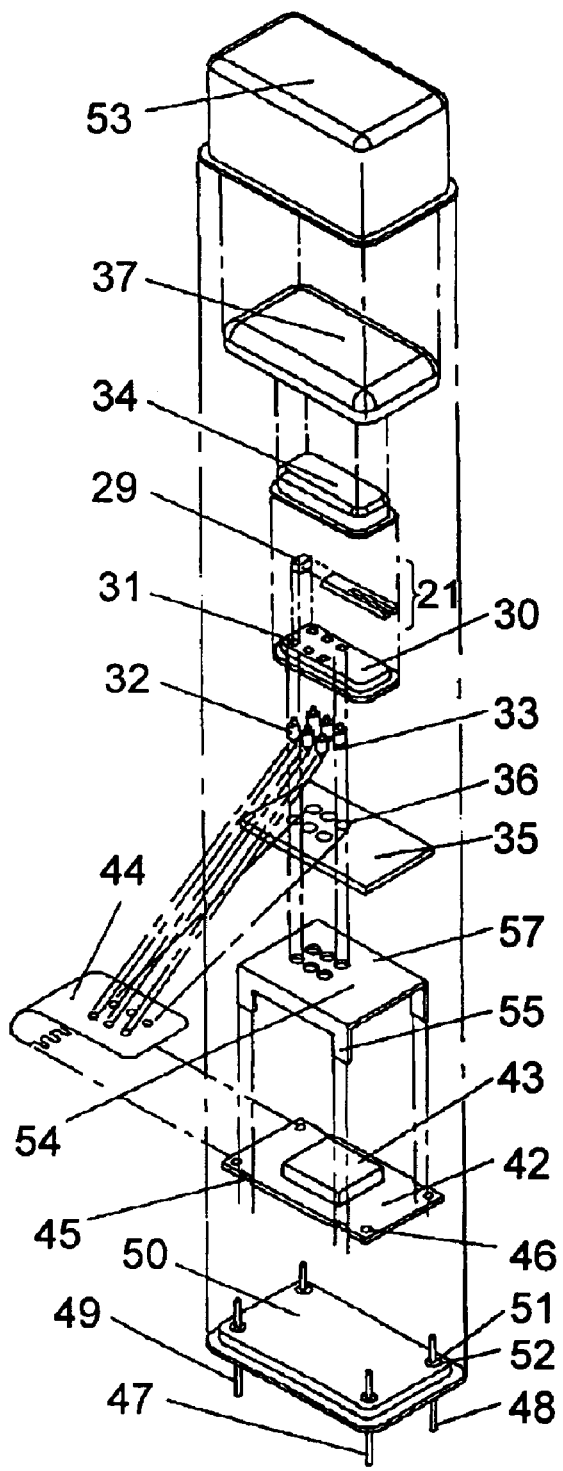
FIG. 1 is an exploded perspective view of an angular velocity sensor in accordance with an exemplary embodiment of the present invention.
Figure 2:
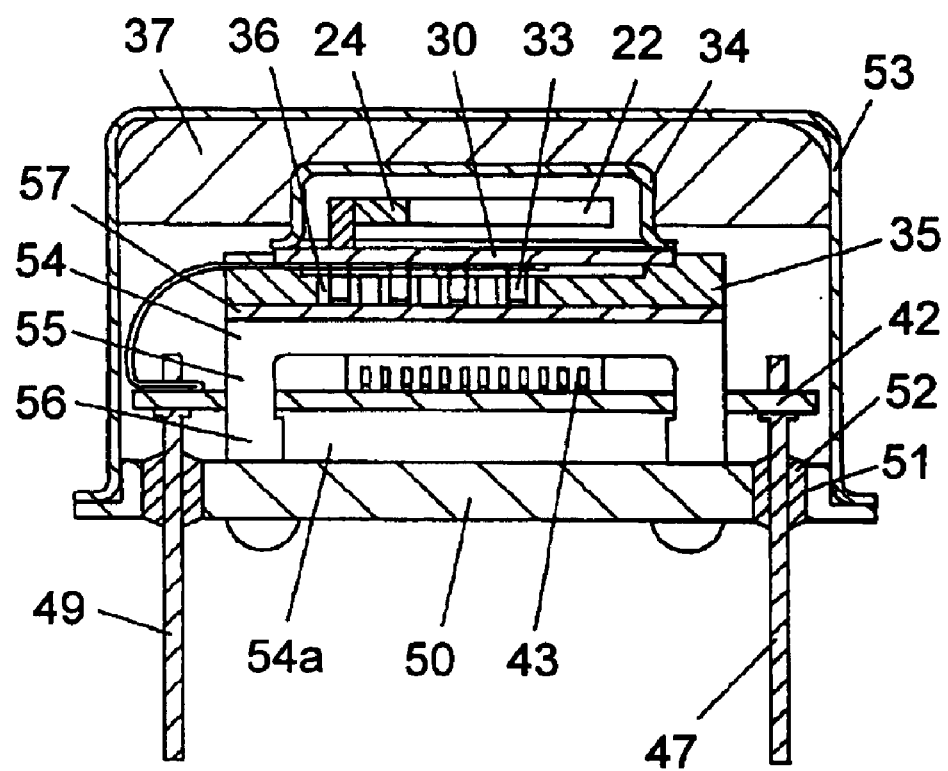
FIG. 2 is a sectional side elevation view of the same angular velocity sensor.
Figure 3:
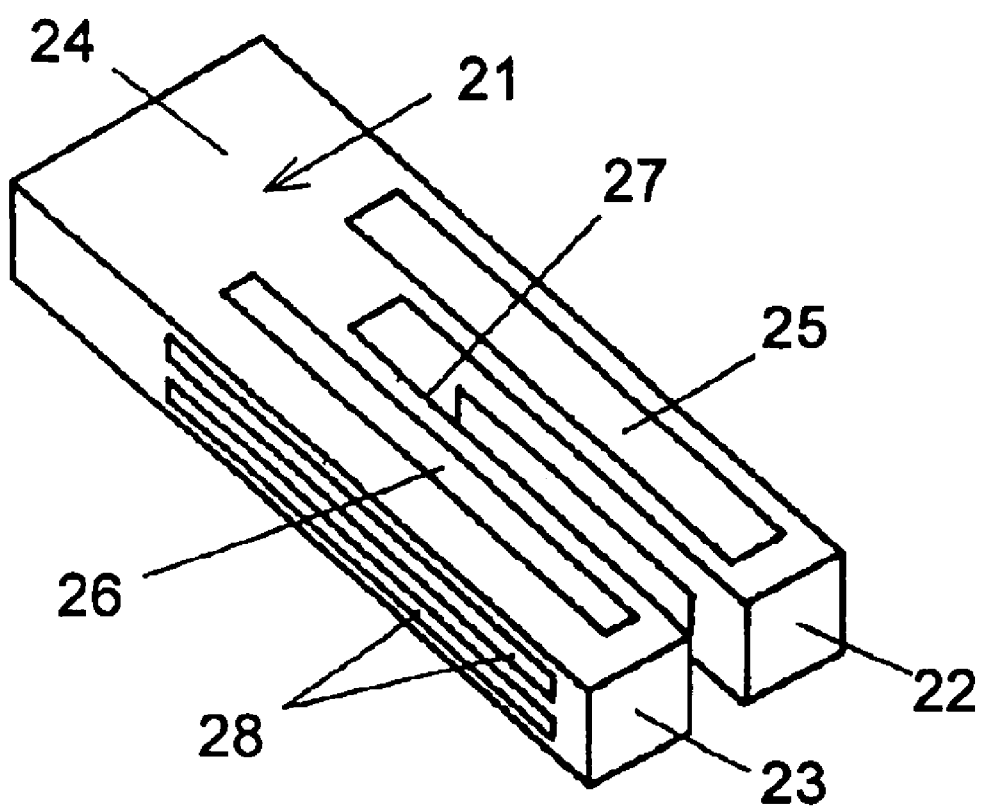
FIG. 3 is a perspective view of a, first oscillator, a second oscillator and a joint of the same angular velocity sensor.
Figure 4:
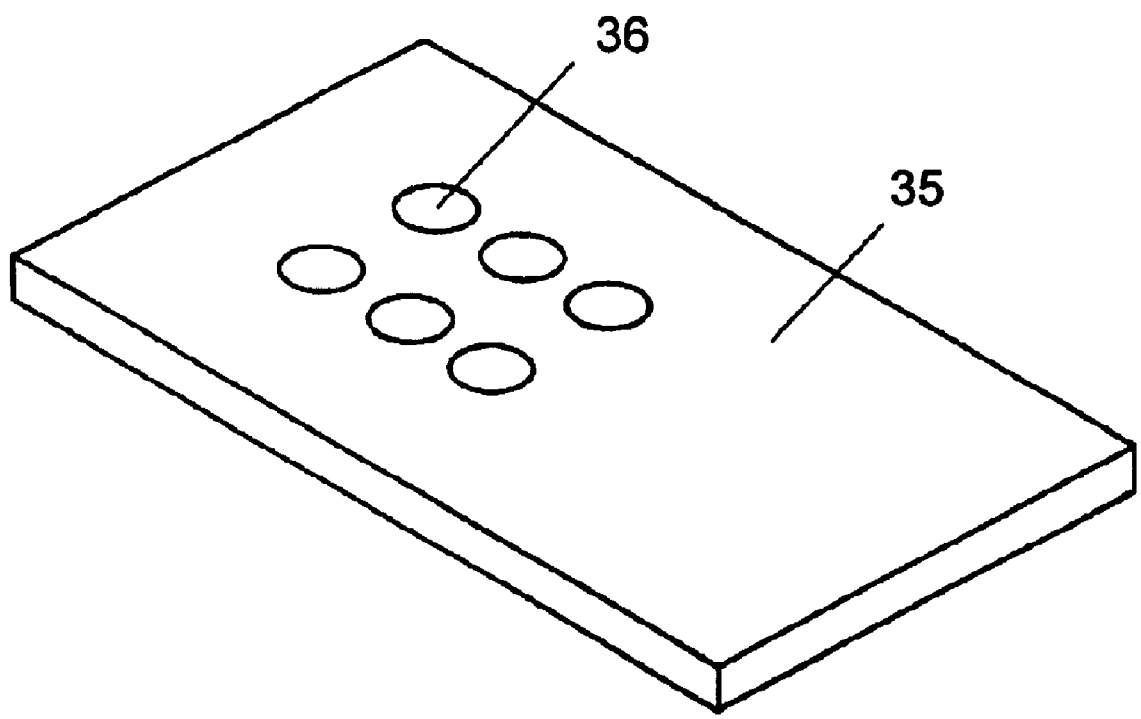
FIG. 4 is a perspective view of a first rubber body of the same angular velocity sensor.
Figure 5:
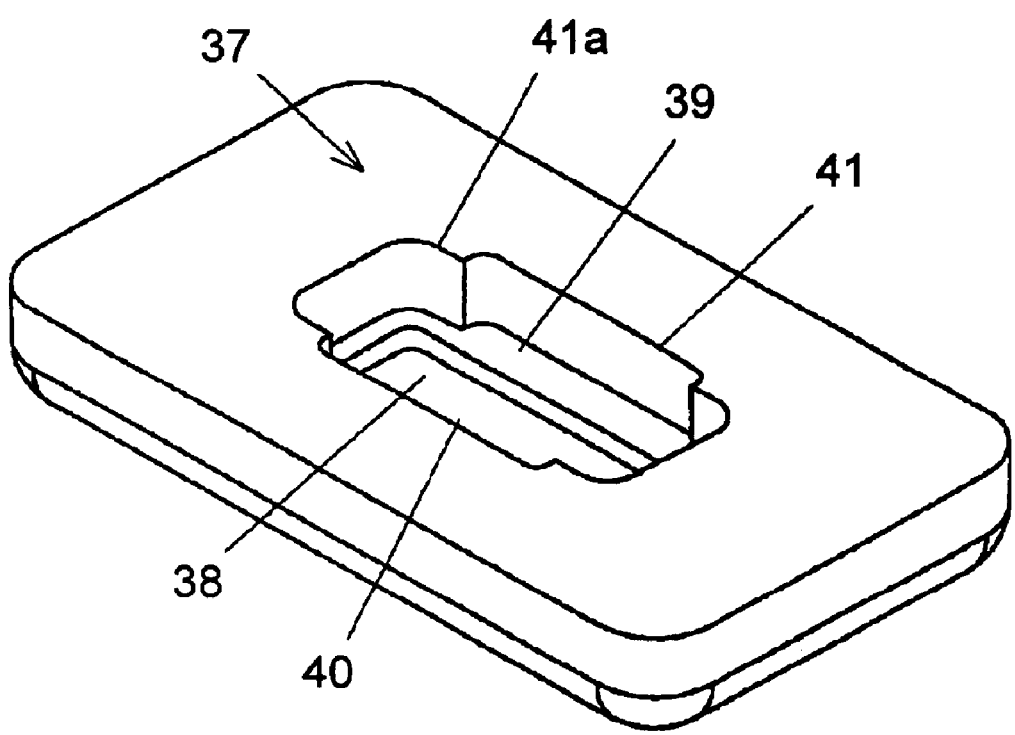
FIG. 5 is a perspective view of a second rubber body of the same angular velocity sensor.
Figure 6:
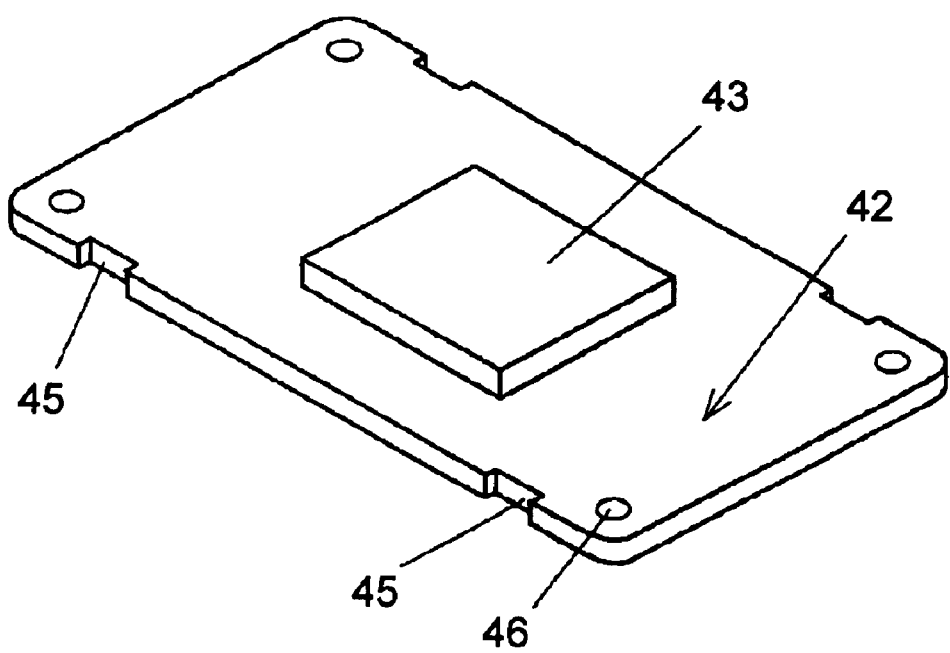
FIG. 6 is a perspective view of a circuit board of the same angular velocity sensor.
Figure 7:
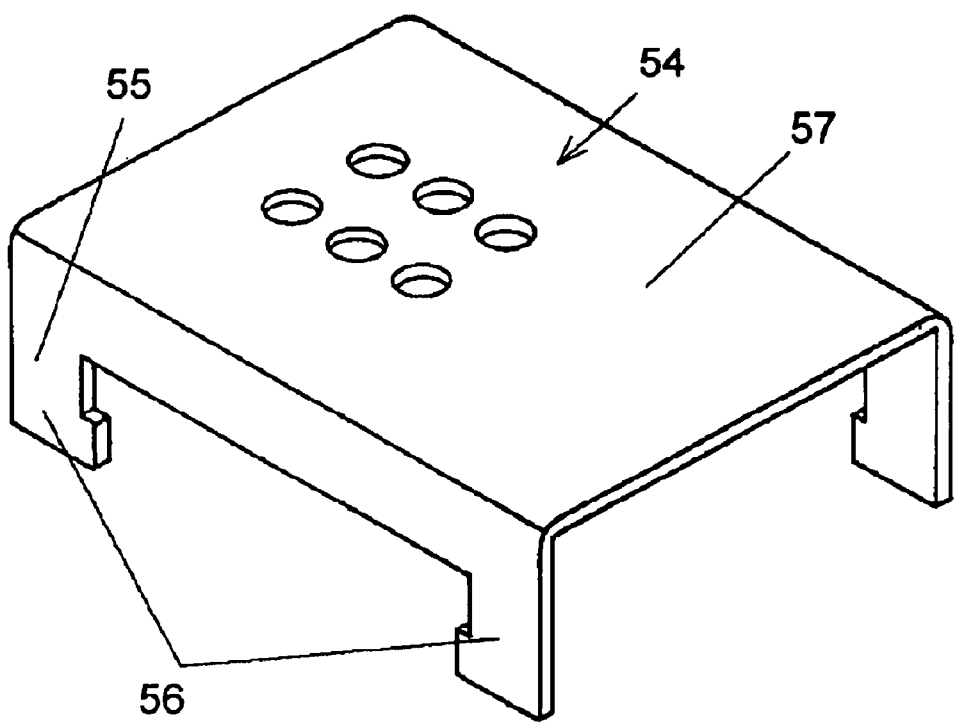
FIG. 7 is a perspective view of a supporting plate of the same angular velocity sensor.

FIG. 1 is an exploded perspective view of an angular velocity sensor in accordance with an exemplary embodiment of the present invention; FIG. 2 is a sectional side elevation view of the same angular velocity sensor; FIG. 3 is a perspective view of a first oscillator, a second oscillator and a joint of the same angular velocity sensor; FIG. 4 is a perspective view of a first rubber body of the same angular velocity sensor; FIG. 5 is a perspective view of a second rubber body of the same angular velocity sensor; FIG. 6 is a perspective view of a circuit board of the same angular velocity sensor, and FIG. 7 is a perspective view of a supporting plate of the same angular velocity sensor. Only the second rubber body of FIG. 5 is shown as seen from the bottom so as to be understood easily.

As shown in FIGS. 1 through 7, crystal tuning fork 21 is composed of first oscillator 22 of a square pole shape, second oscillator 23 of a square pole shape provided in parallel with the first oscillator 22, and joint 24 integrally connecting one end of first oscillator 22 to one end of second oscillator 23. Driving electrode 25 made of gold is provided on each of the four side faces of first oscillator 22. Monitoring electrode 26 made of gold is provided on the upper side face of second oscillator 23. In addition, provided on the inner side face of second oscillator 23 (the face opposite first oscillator 22) is ground electrode (not shown). Moreover, a pair of detecting electrodes 28 made of gold are provided on the outer side face. Metallic supporting base 29 shaped to a rectangular parallelepiped supports the base of joint 24 of tuning fork 21. Metallic first base 30 fixes the bottom of supporting base 29 and also has six terminal-insertion holes 31, inner surface of each of which has insulator 32 made of glass. Six terminals 33 pass through terminal-insertion holes 31 of first base 30 via insulators 32. Terminals 33 through first base 30 are electrically connected to driving electrodes 25, detecting electrodes 28, ground electrode 27, and monitoring electrode 26, respectively, via leads (not shown). Metallic first cover 34 is provided to cover the top face of first base 30. First cover 34 and first base 30 house tuning fork 21 including first oscillator 22, second oscillator 23 and joint 24 therein. In this case, first cover 34 and first base 30 are in close contact with each other so as to create a vacuum in the interior space formed between first base 30 and first cover 34. Thus, first base 30 and the cover 34 are secured to each other so as to create a vacuum in the interior space therebetween and this structure eliminates air resistance of the interior space therebetween base 30 and first cover 34. As a result, first oscillator 22 and second oscillate easily and this is effective in Improving the output sensitivity of the angular velocity sensor.

The first oscillator may have at least one of driving electrode and detecting electrode and the second oscillator may have at least one of detecting electrode and driving electrode.

First rubber body 35 is provided so that its top face is in contact with the bottom face of first base 30. Moreover, first rubber body 35 has escapes 36 for receiving six terminals 33 through first base 30. Since escapes 36 for receiving six terminals 33 through first base 30 are provided in first rubber body 35 as mentioned above, terminals 33 through first base 30 are housed in escapes 36 in first rubber body 35. This structure enables downsizing of the angular velocity sensor.

Second rubber body 37 is provided so as to be in contact with the top face of first cover 34. FIG. 5 shows a perspective view of the second rubber body seen from its bottom. The bottom face of second rubber body 37 has first recess 38 shaped to a rectangular parallelepiped. Moreover, the inner ceiling of first recess 38 has step 39 on outer periphery thereof. The step 39 is brought in contact with the top face of first cover 34. Second rubber body 37 has second recesses 40 protruding outwardly on the inner side faces of the second rubber body. The edges 41 a of long sides 41 in the portions other than second recesses 40 are brought into contact with the outer side faces of first cover 34. Circuit 42 is provided under first base 30 and has electronic components 43 on top and bottom faces thereof. Output signal of electric charges generated by angular velocity from detecting electrodes 28 on second oscillator 23 are supplied to electronic components 43 via terminals 33 and flexible wiring board 44, and electronic components 43 convert the output signals of electric charges into output voltage. Circuit board 42 has four notches 45 in the side faces and terminal-insertion holes 46. Power-supply terminal 47, ground terminal 48, and output terminal 49 project downwardly through these terminal-insertion holes 46 and are soldered thereto.

Second base 50 is provided under circuit board 42 and also has four through holes 51. Power-supply terminal 47, ground terminal 48, and output terminal 49 pass through these through holes 51 via insulators 52 made of glass. Tubular second cover 53 with a bottom is secured to the top face of second base 50 and covers first base 30, first cover 34, first rubber body 35, second rubber body 37 and circuit board 42. Metallic supporting plate 54 is placed above the top face of second base 50 via supports 55 and thus provides space 54a between supporting plate 54 and second base 50. Supports 55 of supporting plate 54 have broad-shouldered portions 56 having a width larger than that of notches 54 in circuit board 42. Provided on the top face of supporting plate 54 is placement part 57. Provided over the top face of this placement part 57 is first rubber body 35. Compressing first rubber body 35 and second rubber body 37, placement part 57 on supporting plate 54 and the inner ceiling of second cover 53 support first base 30 and first cover 34.

Hereinafter described is the assembling method of an angular velocity sensor in accordance with an exemplary embodiment of the present invention structured above.

First, prepare crystal tuning fork 21 integrally formed of first oscillator 22, second oscillator 23 and joint 24.

Next, form driving electrodes 25 on four side faces of first oscillator 22, monitor electrodes 26 on the front and back faces of second oscillator 23, ground electrode 27 (not shown) on the inner side face of second oscillator 23, and a pair of detecting electrodes 28 on the outer side face of second oscillator 23, respectively, using deposition of gold.

Next, after securing the base of tuning fork 21 to supporting base 29, secure the bottom face of supporting base 29 to the top face of first base 30.

Next, after inserting terminals 33 into terminal-insertion holes 31 in first base having insulators 32 made of glass on inner surfaces thereof, electrically connect these terminals 33 to driving electrodes 25, detecting electrodes 28, ground electrode 27 (not shown), and monitoring electrode 26, respectively, via leads (not shown) using soldering.

Next, secure the outer periphery of first base 30 to first cover 34 in a vacuum atmosphere so as to create a vacuum in the interior space formed therebetween.

Next, after mounting electronic components 43 on circuit board 42 and fit supports 55 of supporting plate 54 into notches 45 in circuit board 42.

Next, after passing power-supply terminal 47, ground terminal 48, and output terminal 49 through through-holes 51 in second base 50, fill through holes 51 with insulators 52 made of glass and secure power-supply terminal 47, ground terminal 48, and output terminal 49 to second base 50.

Next, after passing power-supply terminal 47, ground terminal 48, and output terminal 49 through terminal-insertion holes 46 in circuit board 42, electrically connect these terminals to circuit board using soldering. This angular velocity sensor is configured so that the bottom ends of supports 55 of supporting plate 54 are in contact with the top face of second base 50.

Next, electrically connect six terminals 33 to electronic components 43 on circuit board 42 using flexible wiring board 44.

Next, after placing first rubber body 35 over the top face of placement part 57 on supporting plate 54, further place first base 30 and first cover 34 on the top face of first rubber body 35.

Next, place second rubber body 37 over the top face and outer side faces of first cover 34 and sandwich first cover 34 and first base 30 between first rubber body 35 and second rubber body 37.

At last, secure second cover 53 to the outer periphery of second base 50 and allow the interior space formed between second cover 53 and second base 50 to house second rubber body 37, first cover 34, tuning fork 21, first base 30, first rubber body 35, supporting plate 54, and circuit board 42.

Hereinafter described is the operation of an angular velocity sensor in accordance with an exemplary embodiment of the present invention as constructed above.

Applying alternative voltages to driving electrodes 25 on first oscillator 22 of tuning fork 21 allows first oscillator 22 to perform flexural vibration at its characteristic frequency in the driven direction at a speed of V in the driven direction. This flexural vibration is transferred to opposite second oscillator 23 via joint 24 and second oscillator 23 also performs flexural vibration at its characteristic frequency in the driven direction at a speed of V in the driven direction. When tuning fork 21 rotates at an angular velocity of ω around the longitudinal central axis of tuning fork 21 while second oscillator 23 and first oscillator 22 performing flexural vibration, a Coriolis force of F =2 mVω is generated in second oscillator 23. The output signal of charges generated by the Coriolis force in detecting electrodes 28 on second oscillator 23 is converted into output voltage using electronic components 43 on circuit board 42 via leads (not shown) and terminal 33. The output signal is input into a computer (not shown) via output terminal 49 of second base 50 for processing and the output signal is detected as angular velocity.

Now consider the case where strong vibrations are applied to the angular velocity sensor. With the angular velocity sensor in accordance with the exemplary embodiment of the present invention, supporting plate 54 having placement part 57 for placing first rubber body 35 over the top face thereof is placed above the top face of second base 50 via at least two supports 55 so as to provide space 54a between the top face of second base 50 and supporting plate 54. Moreover, the top face of this supporting plate 54 and the inner ceiling of second cover 53 compress first rubber body 35 and second rubber body 37. As a result, first base 30 and first cover 34 housing first oscillator 22 and second oscillator 23 therein are securely supported by first rubber body 35 and second rubber body 37. This structure is effective in reducing external vibrations transferred to first oscillator 22 and second oscillator 23 even when the external vibrations are applied to the angular velocity sensor.

Figure 8:
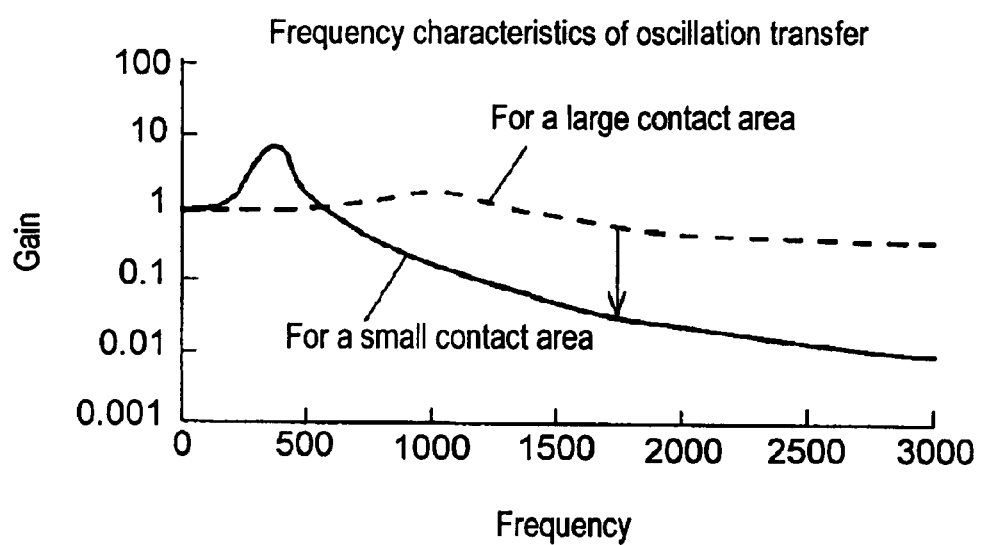
FIG. 8 is a graph showing transfer characteristics of vibration varying with areas in which the second rubber body is in contact with the first cover in the same angular velocity sensor.
Figure 9:
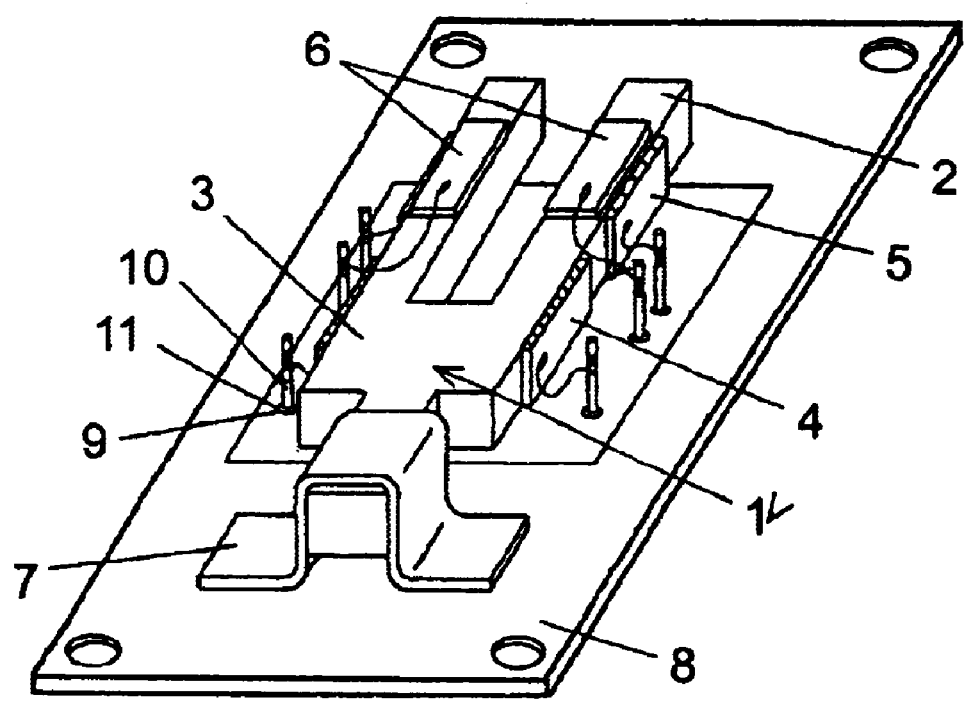
FIG. 9 is a perspective view of a conventional angular velocity sensor showing that a tuning fork is secured to a base.
Figure 10:
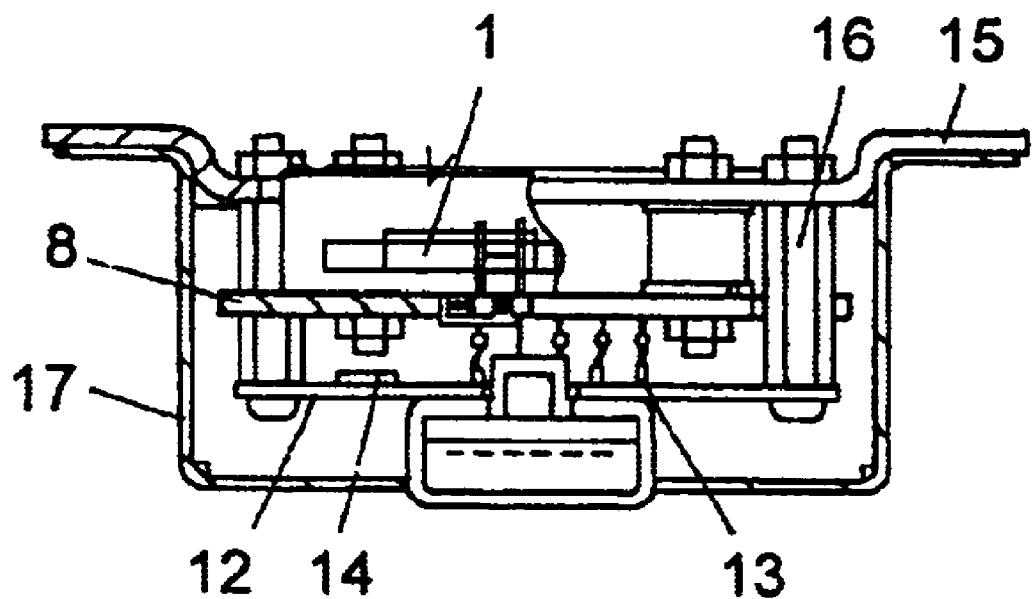
FIG. 10 is a sectional side elevation view of the conventional angular velocity sensor.

With the angular velocity sensor in accordance with an exemplary embodiment of the present invention, as shown in FIG. 5, second rubber body 37 has first recess 38 on the bottom face thereof, and moreover, this first recess 38 has step 39 in the inner ceiling thereof. Then the bottom face of this step 39 is brought into contact with the top face of first cover 34. Since second recesses 40 further projecting outwardly are provided on the inner side faces of first recess 38, edges 41a in the portions other than second recesses 40 provided on the inner side faces of first recess 38 are in contact with the outer side faces of first cover 34. Such contact reduces the area in which second rubber body 37 is in contact with first cover 34; therefore second rubber body 37 reduces external vibration transferred to the angular velocity sensor, especially vibration of higher-frequency, as shown in FIG. 8. FIG. 8 shows frequency characteristics of vibration transfer varying with size of the areas in which the second rubber body is in contact with the first cover. As a result, external vibrations are difficult to be transferred to first oscillator 22 and second oscillator 23 and this feature is effective in providing an angular velocity sensor with stable characteristics.

Next, consider the case where strong rotational vibrations are applied to the angular velocity sensor. With the angular velocity sensor in accordance with an exemplary embodiment of the present invention, step 39 in second rubber body 37 is brought into contact with the outer periphery of the top face of first cover 34 and edges 41 a of long sides 41 of first recess 38 in second rubber body 37 are brought into contact with outer side faces of first cover 34. Thus, first cover 34 is in contact with second rubber 37 only on the outer periphery of the top face and the edges of the outer side faces thereof. As a result, any external rotational shock applied to the angular velocity sensor will not rotate fist cover easily because first cover 34 is secured to the second rubber body on the outer periphery of the top face and the edges of the outer side faces thereof. Consequently, external rotational vibrations applied to the angular velocity sensor will not generate output from second oscillator 23. This feature is effective in providing an angular velocity sensor with stable output characteristics.

Now, consider the case where strong lateral (in FIG. 2) vibrations are applied to the angular velocity sensor. With the angular velocity sensor in accordance with the exemplary embodiment of the present invention, since notches 45 for positioning four supports 55 of supporting plate 54 are provided in the side faces of circuit board 42, supports 55 of supporting plate 54 fit into these notches 45. Therefore, any strong external lateral vibration applied to the angular velocity sensor will not move supporting plate 54 supported by circuit board 42 and this feature is effective in providing an angular velocity sensor with stable characteristics.

Next, consider the case where strong vertical (in FIG. 2) vibrations are applied to the angular velocity sensor. With the angular velocity sensor in accordance with the exemplary embodiment of the present invention, four supports 55 of supporting plate 54 have broad-shouldered portions 56 having a width larger than that of notches 45 in circuit board 42. This structure prevents supports 55 from moving out of circuit board 42 even when strong vertical shock force is applied to the angular velocity sensor. As a result, first oscillator 22 and second oscillator 23 are securely supported and this secure support is effective in stabilizing the output of the angular velocity sensor.

INDUSTRIAL APPLICABILITY

As hereinabove described, an angular velocity sensor of the present invention is structured so that a supporting plate having a placement part for placing a first rubber body over the top face thereof is placed above the top face of a second base via at least two supports so as to provide a space between the top face of the second base and the supporting plate. In addition, the top face of this supporting plate and the inner ceiling of a second cover compress the first rubber body and a second rubber body. Therefore, a first base and a first cover housing a first oscillator and a second oscillator therein are securely supported by the first rubber body and the second rubber body. This secure support prevents the first oscillator and the second oscillator from the movement caused by transferred vibration, even when external vibrations are applied to the angular velocity sensor. As a result, an angular velocity sensor having stable output against vibration can be provided.

What is claimed is:

1. An angular velocity sensor comprising:
   a tuning fork for outputting a signal responsive to angular velocity;
   a first base having a top face for securing a part of said tuning fork thereto;
   a first cover for covering said tuning fork together with said first base;

a second rubber body in contact with a top face of said first cover;

a first rubber body having a top face in contact with a bottom face of said first base;

a supporting plate having a top face in contact with a bottom face of said first rubber body;

a second base disposed under said supporting plate; and a second tubular cover having a bottom and covering said tuning fork, said first base, said first cover, said second rubber body, said first rubber body, and said supporting plate together with said second base;

wherein said first rubber body and said second rubber body are compressed without contacting said tuning fork and held by the top face of said supporting plate and an inner ceiling of said second cover.

2. The angular velocity sensor according to claim 1 further comprising a circuit board having electronic components for processing said signal output from said tuning fork and provided between said supporting plate and said second base.

3. An angular velocity sensor comprising:

a tuning fork including:

a first oscillator having at least one of a driving electrode and a detecting electrode;

a second oscillator having at least one of a detecting electrode and a driving electrode; and a joint for connecting one end of said first oscillator and one end of said second oscillator;

a first base having a top face for securing said joint and a plurality of terminal-insertion holes, each of said plurality of terminal-insertion holes allowing passage of a plurality of terminals electrically connected to one of said driving electrode and said detecting electrode;

a first cover secured on the top face of said first base and covering said tuning fork;

a first rubber body having a top face in contact with a bottom face of said first base;

a supporting plate having a placement part having a top face for placing said first rubber body;

a second rubber body provided so as to be in contact with a top face of said first cover;

a circuit board provided under said first base and having electronic components for processing output signal generated by angular velocity from said detecting electrode, said circuit board having a power-supply terminal, ground terminal and output terminal projecting downwardly;

a second base provided under said circuit board and having through holes, said through holes allowing passage and securing of said power-supply terminal, said ground terminal and said output terminal thereto; and a second tubular cover having a bottom secured to a top face of said second base, and covering said tuning fork, said first base, said first cover, said first rubber body, said second rubber body, said supporting plate and said circuit board;

wherein said supporting plate is placed above a top face of said second base via a plurality of supports so as to provide a space between the top face of said second base and said supporting plate and the top face of said supporting plate and an inner ceiling of said second cover compress said first rubber body and said second rubber body without contacting said tuning fork.

4. The angular velocity sensor according to claim 3 wherein a first recess is provided on a bottom face of said second rubber body, a step is provided in an inner ceiling of said first recess, a bottom face of said step and said top face of said first cover are brought into contact with each other, and second recesses further protruding outwardly are provided on inner side faces of said first recess.

5. The angular velocity sensor according to claim 4 wherein said first recess in said second rubber body is shaped to a rectangular parallelepiped, said step is provided on an outer periphery of said inner ceiling of said first recess, said second recesses are provided only the portions along long sides of said first recess other than edges thereof, said first cover is shaped to a rectangular parallelepiped having an opening on a bottom thereof, said step in said second rubber body is brought into contact with an outer periphery of said top face of said first cover, and said edges of said long sides of said first recess in said second rubber body are brought into contact with outer side faces of said first cover.

6. The angular velocity sensor according to claim 5 wherein said first rubber body has escapes for receiving said plurality of terminals through said first base.

7. The angular velocity sensor according to claim 5 wherein side faces of said circuit board have notches for positioning said plurality of supports.

8. The angular velocity sensor according to claim 5 wherein said first base and said first cover are secured to each other so as to create a vacuum in an interior space formed therebetween.

9. The angular velocity sensor according to claim 5 wherein said plurality of supports of said supporting plate have broad-shouldered portions having a width larger than that of said notches.

10. The angular velocity sensor according to claim 4 wherein said first rubber body has escapes for receiving said plurality of terminals through said first base.

11. The angular velocity sensor according to claim 4 wherein side faces of said circuit board have notches for positioning said plurality of supports.

12. The angular velocity sensor according to claim 4 wherein said first base and said first cover are secured to each other so as to create a vacuum in an interior space formed therebetween.

13. The angular velocity sensor according to claim 4 wherein said plurality of supports of said supporting plate have broad-shouldered portions having a width larger than that of said notches.

14. The angular velocity sensor according to claim 3 wherein said first rubber body has escapes for receiving said plurality of terminals through said first base.

15. The angular velocity sensor according to claim 3 wherein side faces of said circuit board have notches for positioning said plurality of supports.

16. The angular velocity sensor according to claim 3 wherein said first base and said first cover are secured to each other so as to create a vacuum in an interior space formed therebetween.

17. The angular velocity sensor according to claim 3 wherein said plurality of supports of said supporting plate have broad-shouldered portions having a width larger than that of said notches.

18. An angular velocity sensor comprising:

a tuning fork for outputting a signal responsive to angular velocity;

a first base having a top face for securing a part of said tuning fork thereto;

a first cover for covering said tuning fork together with said first base;

a second rubber body in contact with a top face of said first cover;

a first rubber body having a top face in contact with a bottom face of said first base;

a supporting plate having a top face in contact with a bottom face of said first rubber body;

a second base disposed under said supporting plate; and a second tubular cover having a bottom and covering said tuning fork, said first base, said first cover, said second rubber body, said first rubber body, and said supporting plate together with said second base;

wherein said first rubber body and said second rubber body are each held in a compressed state, without contacting each other, by being held between the top face of said supporting plate and an inner ceiling of said second cover, thereby to reduce external vibration to said tuning fork.

19. An angular velocity sensor comprising:

a tuning fork for outputting a signal responsive to angular velocity;

a first base having a top face for securing said tuning fork thereto;

a supporting base for fixing said tuning fork to said first base;

a first cover for covering said tuning fork together with said first base;

a second rubber body in contact with a top face of said first cover;

a first rubber body having a top face in contact with a bottom face of said first base;

a supporting plate having a top face in contact with a bottom face of said first rubber body;

a second base disposed under said supporting plate; and a second tubular cover having a bottom and covering said tuning fork, said first base, said first cover, said second rubber body, said first rubber body, and said supporting plate together with said second base;

wherein said first rubber body and said second rubber body are compressed and held by the top face of said supporting plate and an inner ceiling of said second cover.

* * * * *

UNITED STATES PATENT AND TRADEMARK OFFICE
CERTIFICATE OF CORRECTION

PATENT NO. : 6,739,192 B1
DATED : May 25, 2004
INVENTOR(S) : Okoshi et al.

It is certified that error appears in the above-identified patent and that said Letters Patent is hereby corrected as shown below:

<u>Title page,</u>
Item [57], ABSTRACT,
Line 3, delete "having plate".

Signed and Sealed this

Seventh Day of June, 2005

JON W. DUDAS
*Director of the United States Patent and Trademark Office*